(12) United States Patent
Jang et al.

(10) Patent No.: US 12,094,196 B2
(45) Date of Patent: Sep. 17, 2024

(54) ROBOT AND METHOD FOR CONTROLLING THEREOF

(71) Applicant: SAMSUNG ELECTRONICS CO., LTD., Suwon-si (KR)

(72) Inventors: Junho Jang, Suwon-si (KR); Youngwoon Lee, Suwon-si (KR); Junkyu Lee, Suwon-si (KR); Wonguk Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/072,832

(22) Filed: Oct. 16, 2020

(65) Prior Publication Data

US 2021/0162593 A1 Jun. 3, 2021

Related U.S. Application Data

(60) Provisional application No. 62/942,835, filed on Dec. 3, 2019.

(30) Foreign Application Priority Data

Jul. 21, 2020 (KR) .................. 10-2020-0090526

(51) Int. Cl.
*G06V 20/10* (2022.01)
*B25J 9/16* (2006.01)
(Continued)

(52) U.S. Cl.
CPC .............. *G06V 20/10* (2022.01); *B25J 9/163* (2013.01); *B25J 9/1666* (2013.01);
(Continued)

(58) Field of Classification Search
CPC ................................ B25J 9/163; B25J 9/1666
See application file for complete search history.

(56) References Cited

U.S. PATENT DOCUMENTS 8,315,454 B2 11/2012 Tanaka et al.
8,463,433 B2 6/2013 Nagasaka
(Continued)

FOREIGN PATENT DOCUMENTS

CN 108247637 A 7/2018
CN 109948444 A 6/2019
(Continued)

OTHER PUBLICATIONS

International Search Report (PCT/ISA/210) dated Feb. 2, 2021 issued by the International Searching Authority in International Application No. PCT/KR2020/014457.
(Continued)

*Primary Examiner* — Khoi H Tran
*Assistant Examiner* — Aaron G Cain
(74) *Attorney, Agent, or Firm* — Sughrue Mion, PLLC (57) ABSTRACT

A includes a driver, and a processor configured to: based on an occurrence of an event for performing an operation, acquire target information corresponding to the operation and context information related to the robot, based on at least one of the target information or the context information, select an action plan, acquire action information based on the action plan, and control the driver such that an operation corresponding to the target information is performed based on the action information. The action plan is selected as a first action plan of performing an operation according to first action information stored in advance in the memory, a second action plan of performing an operation according to second action information generated based on the acquired target information and the acquired context information, and a third action plan of performing an operation according to third action information learned based on an operation pattern of the robot.

13 Claims, 9 Drawing Sheets

(51) Int. Cl.
*G05D 1/00* (2006.01)
*G06V 10/82* (2022.01)

(52) U.S. Cl.
CPC ......... *G05D 1/0225* (2013.01); *G05D 1/0238* (2013.01); *G06V 10/82* (2022.01)

(56) References Cited

U.S. PATENT DOCUMENTS

| | | |
|---|---|---|
| 9,238,304 B1 | 1/2016 | Bradski et al. |
| 11,449,064 B1* | 9/2022 | Ebrahimi Afrouzi ........................ G05D 1/0221 |
| 2006/0056678 A1 | 3/2006 | Tanaka et al. |
| 2010/0185328 A1 | 7/2010 | Kim et al. |
| 2011/0238211 A1 | 9/2011 | Shirado et al. |
| 2016/0055677 A1* | 2/2016 | Kuffner ............... G06T 11/00 901/1 |
| 2016/0089791 A1 | 3/2016 | Bradski et al. |
| 2017/0282363 A1 | 10/2017 | Yamada et al. |
| 2017/0341231 A1* | 11/2017 | Tan ................ B25J 9/162 |
| 2018/0147721 A1* | 5/2018 | Griffin ............... A47L 11/4011 |
| 2018/0326584 A1 | 11/2018 | Wang et al. |
| 2019/0156203 A1 | 5/2019 | Kang et al. |
| 2019/0160660 A1* | 5/2019 | Husain ............... B25J 9/1694 |
| 2019/0358822 A1* | 11/2019 | Wojciechowski ..... B25J 11/009 |
| 2020/0016753 A1 | 1/2020 | Shin |
| 2020/0033135 A1 | 1/2020 | Huh et al. |

FOREIGN PATENT DOCUMENTS

| | | |
|---|---|---|
| JP | 2006-82150 A | 3/2006 |
| JP | 2010-260141 A | 11/2010 |
| JP | 5033994 B2 | 9/2012 |
| JP | 5109573 B2 | 12/2012 |
| JP | 2020046759 A | 3/2020 |
| KR | 10-2010-0086262 A | 7/2010 |
| KR | 10-1273300 B1 | 6/2013 |
| KR | 10-2016-0128124 A | 11/2016 |
| KR | 1020190036402 A | 4/2019 |
| KR | 101977274 B1 | 8/2019 |
| KR | 10-2019-0104482 A | 9/2019 |
| KR | 1020190104931 A | 9/2019 |
| KR | 102096875 B1 | 5/2020 |

OTHER PUBLICATIONS

Written Opinion (PCT/ISA/237) dated Feb. 2, 2021 issued by the International Searching Authority in International Application No. PCT/KR2020/014457.

Communication dated Oct. 5, 2022 issued by the European Patent Office in European Patent Application No. 20896494.0.

Communication dated Oct. 30, 2023, issued by National Intellectual Property Office of P.R. China in Chinese Patent Application No. 202080079275.2.

* cited by examiner

| Goal | Context | Path | Action |
|---|---|---|---|
| MOVING TO A CHARGING STATION | 7 am | R1 | 1. move to c |
| MOVING TO A CHARGING STATION | 1 pm | R2 | 1. move to a<br>2. move to c |
| MOVING TO A CHARGING STATION | 1 pm | R3 | 1. move to b<br>2. move to c |

ROBOT AND METHOD FOR CONTROLLING THEREOF

CROSS-REFERENCE TO RELATED APPLICATION(S)

This application is based on and claims benefit of U.S. Provisional Application No. 62/942,835 filed on Dec. 3, 2019, and is based on and claims priority under 35 U.S.C. § 119 to Korean Patent Application No. 10-2020-0090526, filed on Jul. 21, 2020, in the Korean Intellectual Property Office, the disclosures of which are incorporated by reference herein in their entireties.

BACKGROUND

1. Field

The disclosure relates to a robot and a method for controlling thereof, and more particularly, to a robot that adaptively selects an action plan according to a situation and performs an operation corresponding to the selected action plan, and a method for controlling thereof.

2. Description of Related Art

Recently, spurred by the development of electronic technologies, research for using various robots including robot cleaners in everyday life has been actively pursued. In order for robots to be used in everyday life, robots should be able to adaptively perform operations according to various situations. Related art robots perform operations according to predetermined orders, and by such related art methods, robots are not able to adaptively perform operations according to the situations of the surroundings. Thus, there is a problem that the efficiency of a job might deteriorate.

SUMMARY

Provided are a robot that is able to adaptively select an action plan according to a situation and perform an operation corresponding to the selected action plan, and a control method thereof.

Additional aspects will be set forth in part in the description which follows and, in part, will be apparent from the description, or may be learned by practice of the presented embodiments.

In accordance with an aspect of the disclosure, there is provided a robot including a driver for moving the robot, a memory storing at least one instruction, and a processor configured to, based on an event for performing an operation occurring, acquire target information corresponding to the operation and context information related to the robot, and based on at least one of the target information or the context information, select one of a first action plan of performing an operation according to action information stored in advance in the memory, a second action plan of performing an operation according to action information generated based on the context information, or a third action plan of performing an operation according to action information learned based on an operation pattern of the robot, acquire at least one action information based on the selected action plan, and control the driver such that an operation corresponding to the target information is performed based on the acquired at least one action information may be provided.

The processor may be configured to: based on the target information corresponding to target information stored in advance in the memory, select the first action plan, and based on the target information not corresponding to the prestored target information, select one of the second action plan or the third action plan.

The processor may be configured to: based on the target information not corresponding to the prestored target information, identify whether the third action plan corresponding to the context information is stored in the memory, based on the third action plan corresponding to the context information being stored in the memory, select the stored third action plan, and based on the third action plan corresponding to the context information not being stored in the memory, select the second action plan.

The memory may store a look-up table to which target information, context information, and action information are matched, and the processor may be configured to: compare the look-up table with the acquired target information and the acquired context information and identify whether the third action plan corresponding to the context information is stored in the memory.

The processor may be configured to: based on the third action plan being selected, acquire action information based on the look-up table.

The processor may be configured to: based on the second action plan being selected, input the target information and the context information into a trained artificial intelligence (AI) model and acquire action information corresponding to the second action plan.

The processor may be configured to: acquire feedback information regarding action information corresponding to the performed operation, and update the prestored action information based on the acquired feedback information and feedback information regarding action information corresponding to the prestored third action plan.

The context information may be related to the robot includes at least one of information on the current time, information on the current location of the robot, or information on obstacles around the robot.

In accordance with an aspect of the disclosure, there is provided a method for controlling a robot including the steps of, based on an event for performing an operation occurring, acquiring target information corresponding to the operation and context information related to the robot, and based on at least one of the target information or the context information, selecting one of a first action plan of performing an operation according to prestored action information, a second action plan of performing an operation according to action information generated based on the context information, or a third action plan of performing an operation according to action information learned based on an operation pattern of the robot, acquiring at least one action information based on the selected action plan, and performing an operation corresponding to the target information based on the acquired at least one action information may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, terms used in this specification will be described briefly, and then the disclosure will be described in detail.

As used herein, general terms that are currently used widely were selected as far as possible, in consideration of the functions described herein. However, the terms may vary depending on the intention of those skilled in the art who work in the pertinent field, previous court decisions, or emergence of new technologies. Also, in particular cases, there may be terms that were designated by the applicant on his own, and in such cases, the meaning of the terms will be described in detail. Accordingly, the terms used herein should be defined based on the meaning of the terms and the overall content, but not just based on the names of the terms.

Various modifications may be made to embodiments, and there may be various types of embodiments. Accordingly, certain embodiments are illustrated in drawings, and described in detail below. However, it should be noted that various embodiments are not for limiting the scope to a specific embodiment, but they should be interpreted to include all modifications, equivalents or alternatives of embodiments described herein.

As used herein, the terms such as "1st" or "first," "2nd" or "second," etc., may modify corresponding components regardless of importance or order and are used to distinguish one component from another without limiting the components.

Singular expressions include plural expressions, unless defined obviously differently in the context. As used herein, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Hereinafter, certain embodiments will be described in detail with reference to the accompanying drawings. However, embodiments may be implemented in various different forms, and are not limited to embodiments described herein. Also, in the drawings, parts that are not related to explanation were omitted, and throughout the specification, similar components are designated by similar reference numerals.

Figure 1:
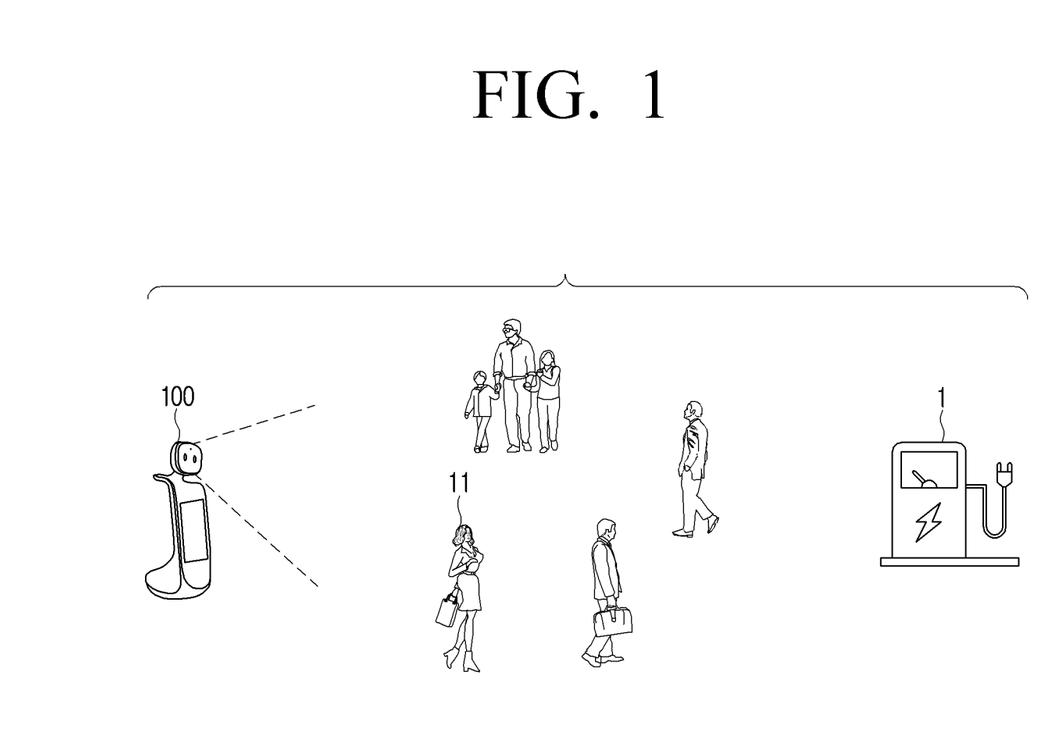
FIG. 1 is a diagram for illustrating a concept regarding a method for controlling a robot according to an embodiment.

FIG. 1 is a diagram for illustrating a concept regarding a method for controlling a robot according to an embodiment.

The robot 100 may detect an event for performing an operation. As an example, the robot 100 may detect an event for performing an operation of moving to a charging station 1, e.g., a specific location. Specifically, the robot 100 may detect an event in which the remaining amount of the battery provided in the robot 100 falls lower than or equal to a threshold value, and/or an event for moving to the charging station 1 or another specific location, and/or an event for stopping driving such as when the robot 100 detects an event in which an object 11 is located within a threshold distance from the robot 100.

If an event for performing an operation is detected as described above, the robot 100 may acquire target information corresponding to the operation and context information related to the robot 100. The target information means information regarding a specific state of the robot 100 that the robot 100 needs to reach through a specific operation. For example, the target information may be information on about the robot 100 located at a charging station 1 (e.g., location information of a charging station. The context information related to the robot 100 may include information on the robot 100 and the situation around the robot 100. For example, the context information may include at least one of information on the remaining amount of the battery of the robot 100, information on the number or density of obstacles around the robot 100, information on the current location of the robot 100, information on the distance from the current location of the robot 100 to a destination, information on the current time, or information on the current date or the day of the week, etc.

The robot 100 may select an action plan based on the acquired target information and context information. An action plan means a list of action information for the robot 100 to perform specific operations. An action plan may include action plans of various types. For example, an action plan may include a first action plan of performing an operation according to prestored action information, a second action plan of performing an operation according to action information generated based on a context, and a third action plan of performing an operation according to action information learned based on an operation pattern of the robot 100.

The first action plan includes action information defined in advance by the manufacturer or a user, and it may be stored in advance in the robot 100. The first action plan is action information related to safety, and it may include action information for stopping driving in an emergency, etc. The first action plan may include action information stored in the robot 100 when the robot 100 is initially installed and/or may be received thereafter from an apparatus from the outside (or updated).

The second action plan may include action information generated by the robot 100 based on at least one of target information or context information. For example, the robot 100 may input target information and context information into a neural network model trained in advance, and generate action information. The robot 100 may store the generated action information and feedback information corresponding thereto.

The third action plan means an action plan of performing an operation according to action information learned based on an operation pattern of the robot. The third action plan may include at least one action information among action information corresponding to the second action plan. The third action plan may be acquired based on data accumulated as an operation corresponding to the second action plan is performed. For example, the third action plan may be selected to include action information corresponding to the current target information and the current context information among action information included in the second action plan. The third action plan may be acquired based on a look-up table to which target information, context information, and action information are matched.

The first action plan may also be referred to as a static plan, the second action plan may also be referred to as a dynamic plan, and the third action plan may also be referred to as a pattern plan, respectively.

If the acquired target information corresponds to prestored target information, the robot 100 may select the first action plan. For example, if target information of stopping driving is acquired, the robot 100 may select the first action plan, and acquire action information based on the first action plan (i.e., action information regarding stopping of driving). The robot 100 may perform an operation corresponding to the target information (i.e., stopping of driving) based on the acquired action information. As described above, if the acquired target information corresponds to prestored target information, the robot 100 does not generate new action information, but operates based on predefined action information. Accordingly, the robot 100 may perform a predefined operation swiftly.

If the acquired target information (target information of moving to the charging station 1) does not correspond to prestored target information, the robot 100 may select the second action plan or the third action plan. The robot 100 may identify whether the third action plan corresponding to the context information is stored in the robot 100. If the third action plan corresponding to the context information is stored in the robot 100, the robot 100 may select the stored third action plan. If the third action plan corresponding to the context information is not stored in the robot 100, the robot 100 may select the second action plan. For example, if action information corresponding to the current location and the current time of the robot 100 is stored in the robot 100, the robot 100 may select the third action plan and move to the charging station 1 based on the stored action information corresponding to the third action plan. The robot 100 does not need to generate new action information, and thus the robot 100 may quickly move to the charging station 1.

If action information corresponding to the current location and the current time of the robot 100 are not stored in the robot 100, the robot 100 may select the second action plan. The robot 100 may acquire action information corresponding to the second action plan based on the acquired target information and context information. For example, the robot 100 may input the acquired target information and context information into a trained neural network model and acquire action information corresponding to the second action plan. That is, the robot 100 may generate action information for moving to the charging station 1.

The robot 100 may update the stored third action plan. The robot 100 may store feedback information regarding action information corresponding to the performed operation. For example, feedback information includes an index for evaluating action information corresponding to the performed operation, and it may mean a cost value corresponding to action information. The robot 100 may acquire feedback information regarding action information corresponding to an operation recently performed. The robot 100 may update the prestored action information based on the acquired feedback information and feedback information regarding prestored action information corresponding to the third action plan. For example, if the acquired cost value is smaller than the prestored cost value, the robot 100 may update the prestored action information to action information corresponding to an operation recently performed. Accordingly, the robot 100 may perform an operation corresponding to target information more effectively.

Figure 2:
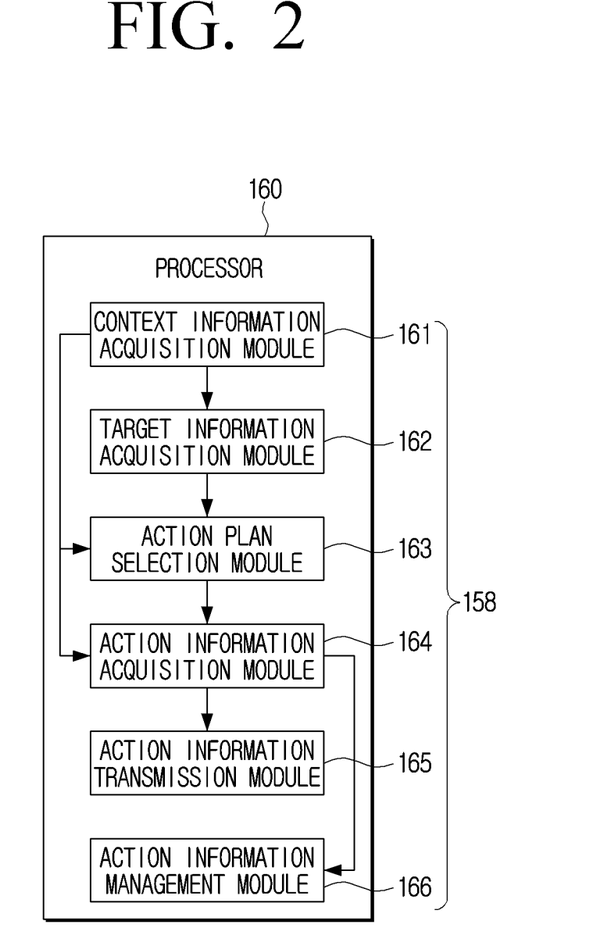
FIG. 2 is a block diagram illustrating a processor of the robot according to an embodiment.

FIG. 2 is a block diagram illustrating a processor of the robot according to an embodiment. The robot 100 may include a processor 160, and the processor 160 may include a plurality of modules 158 including a context information acquisition module 161, a target information acquisition module 162, an action plan selection module 163, an action information acquisition module 164, an action information transmission module 165, and an action information management module 166.

The context information acquisition module 161 may acquire context information related to the robot 100. The context information acquisition module 161 may acquire context information based on data acquired through a sensor provided on the robot 100. For example, the context information acquisition module 161 may acquire the current location information of the robot 100 based on data acquired from a global positioning (GPS) sensor installed on the robot 100. The context information acquisition module 161 may acquire information on the number or density of obstacles around the robot 100 based on data acquired from an obstacle detection sensor and/or may acquire information on the remaining amount of the battery of the robot 100 or information on the current time.

The target information acquisition module 162 may acquire target information based on context information related to the robot 100 acquired through the context information acquisition module 161. For example, if the remaining amount of the battery of the robot 100 falls lower than or equal to a threshold value, the target information acquisition module 162 may acquire target information for moving the robot 100 to a charging station. The target information acquisition module 162 may input the acquired context information into a trained neural network model and infer target information corresponding to the acquired context information.

The action plan selection module 163 may select one of the first action plan, the second action plan, or the third action plan based on at least one of context information or target information. If the acquired target information corresponds to prestored target information, the action plan selection module 163 may select the first action plan. If the acquired target information does not correspond to prestored target information, the action plan selection module 163 may select one of the second action plan or the third action plan. Here, if the third action plan corresponding to the acquired context information is stored in the robot 100, the action plan selection module 163 may select the stored third action plan. Meanwhile, if the third action plan corresponding to the acquired context information is not stored in the robot 100, the action plan selection module 163 may select the second action plan.

The action information acquisition module 164 may acquire action information based on the selected action plan. Action information corresponding to the first action plan and the third action plan may be stored in the robot 100. Accordingly, if the first action plan is selected, the action information acquisition module 164 may identify action information corresponding to the first action plan stored in the robot 100. Likewise, if the third action plan is selected, the action information acquisition module 164 may identify action information corresponding to the third action plan stored in the robot 100. As described above, in the case that the first action plan or the third action plan is selected, time for generating action information is not consumed, and thus an operation corresponding to target information can be performed more swiftly. If the second action plan is selected, the action information acquisition module 164 may input the acquired target information and context information into a trained neural network model and generate action information corresponding to the second action plan.

The action information transmission module 165 may transmit acquired action information to various modules provided on the robot 100. For example, the action information transmission module 165 may transmit action information to a voice recognition module.

The action information management module 166 may manage the third action plan, i.e., the pattern plan. The action information management module 166 may update stored action information based on feedback information. For example, if a cost value for action information newly acquired through the action information acquisition module 164 is lower than a cost value for prestored action information, the action information management module 166 may update the prestored action information to the action information newly acquired.

The action information management module 166 may perform a validity check for action information corresponding to the stored third action plan. Alternatively, the action information management module 166 may share stored action information with another external robot.

As described above, a plurality of modules 158 may be located in the processor 160, but an embodiment is not limited thereto, and the plurality of modules 158 may be located in the memory 130. In the case that the plurality of modules 158 are located in the memory 130, the processor 160 may load the plurality of modules 158 from a non-volatile memory into a volatile memory and execute each function of the plurality of modules 158. Loading means an operation of calling data stored in a non-volatile memory to a volatile memory and storing the data, in order that the processor 160 can access the data.

Each module of the processor 160 may be implemented as software, or implemented as a form where software and hardware are combined.

Figure 3:
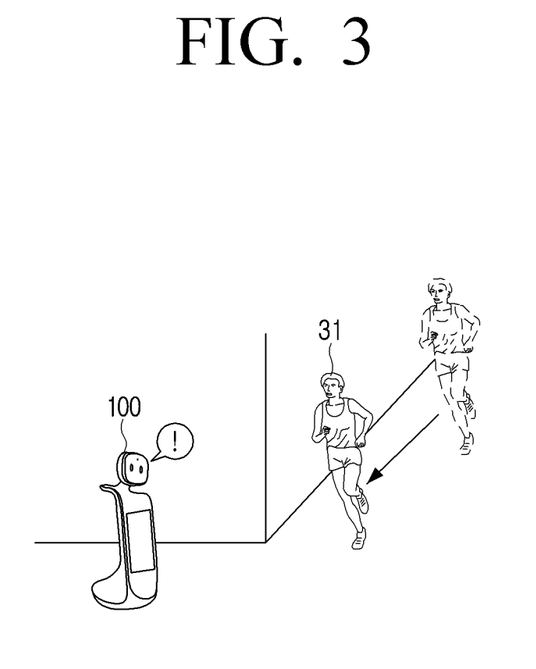
FIG. 3 is a diagram illustrating a situation of acquiring action information corresponding to a first action plan according to an embodiment.

FIG. 3 is a diagram illustrating a situation of acquiring action information corresponding to a first action plan according to an embodiment. Referring to FIG. 3, while the robot 100 is driving, an event in which an object 31 is detected within a threshold distance from the robot 100 may occur. The robot 100 may acquire target information corresponding to the event. For example, the robot 100 may acquire target information which is 'stopping of driving.' The robot 100 may identify whether the acquired target information corresponds to prestored target information. If the acquired target information corresponds to prestored target information, the robot 100 selects the first action plan, i.e., the static plan. The robot 100 may acquire prestored action information corresponding to the prestored target information, and operate based on the acquired action information. That is, the robot 100 may stop driving. In the above example, a swift operation is necessary for preventing collision between the robot 100 and the object 31, and, thus, the robot 100 does not generate action information, but operates by using prestored action information. Accordingly, a safety accident is quickly prevented, and user safety can be improved.

Meanwhile, if the acquired target information does not correspond to prestored target information, the robot 100 may select the second action plan or the third action plan.

Figure 4A:
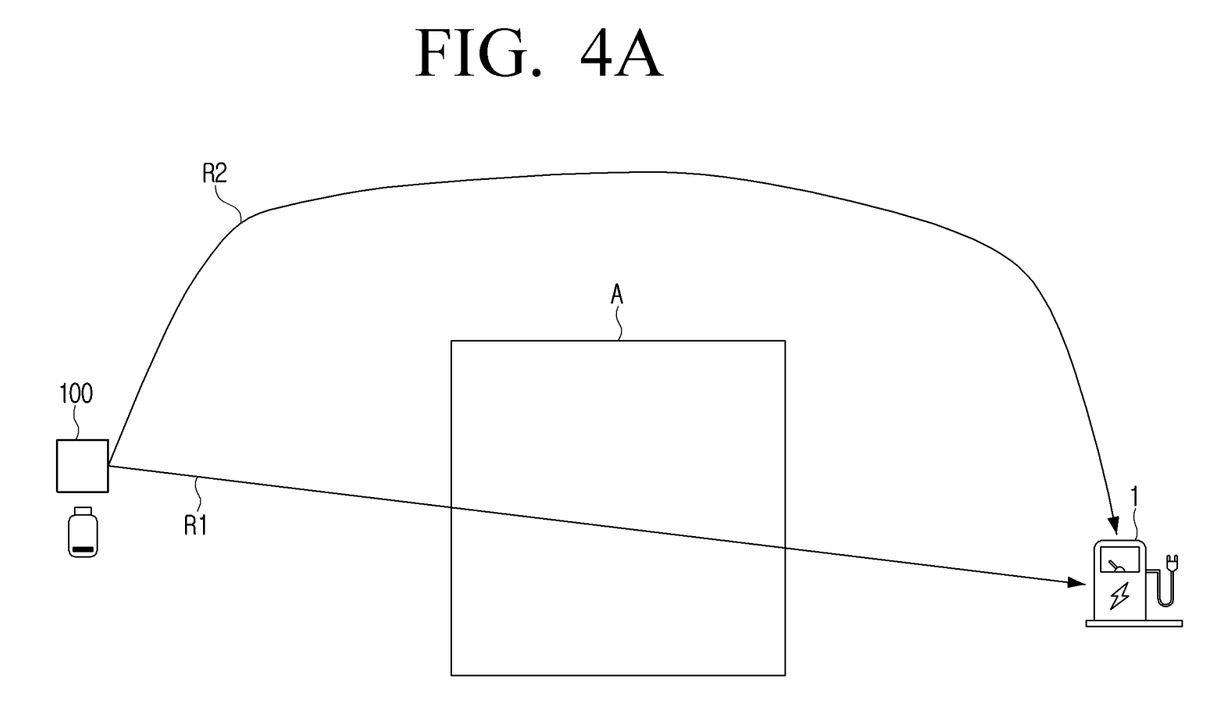
FIG. 4A is a diagram illustrating a situation of acquiring action information corresponding to a second action plan according to an embodiment.

FIG. 4A is a diagram illustrating a situation of acquiring action information corresponding to a second action plan according to an embodiment. The robot 100 may detect an event in which the remaining amount of the battery falls lower than or equal to a threshold value. The robot 100 may acquire target information which is "moving to the charging station." The robot 100 may acquire context information. For example, the robot 100 may acquire information on the current location, information on the current date, and information on the current time. Information on the current location may include map information regarding the current location of the robot 100.

The robot 100 may acquire action information corresponding to the second action plan based on the acquired target information and context information. Specifically, the robot 100 may generate a driving path from the current location to a destination based on the acquired target information and context information. The robot 100 may generate action information for moving to the destination through the generated moving path. For example, in the case that the current time is 7 a.m., the robot 100 may generate a first route R1 which is the shortest route from the current location to the destination. In the case that the current time is 1 p.m., the robot 100 may generate a second route R2 that detours a first area A. That is, at the time when there is high possibility that objects may exist in the first area A, the robot 100 may generate a second route R2 that detours the first area A. However, this is merely an example, and the robot 100 may generate a driving path based on various context information.

The robot 100 may acquire context information from an external apparatus or an external server, and generate a driving path based on the acquired context information.

Figure 4B:
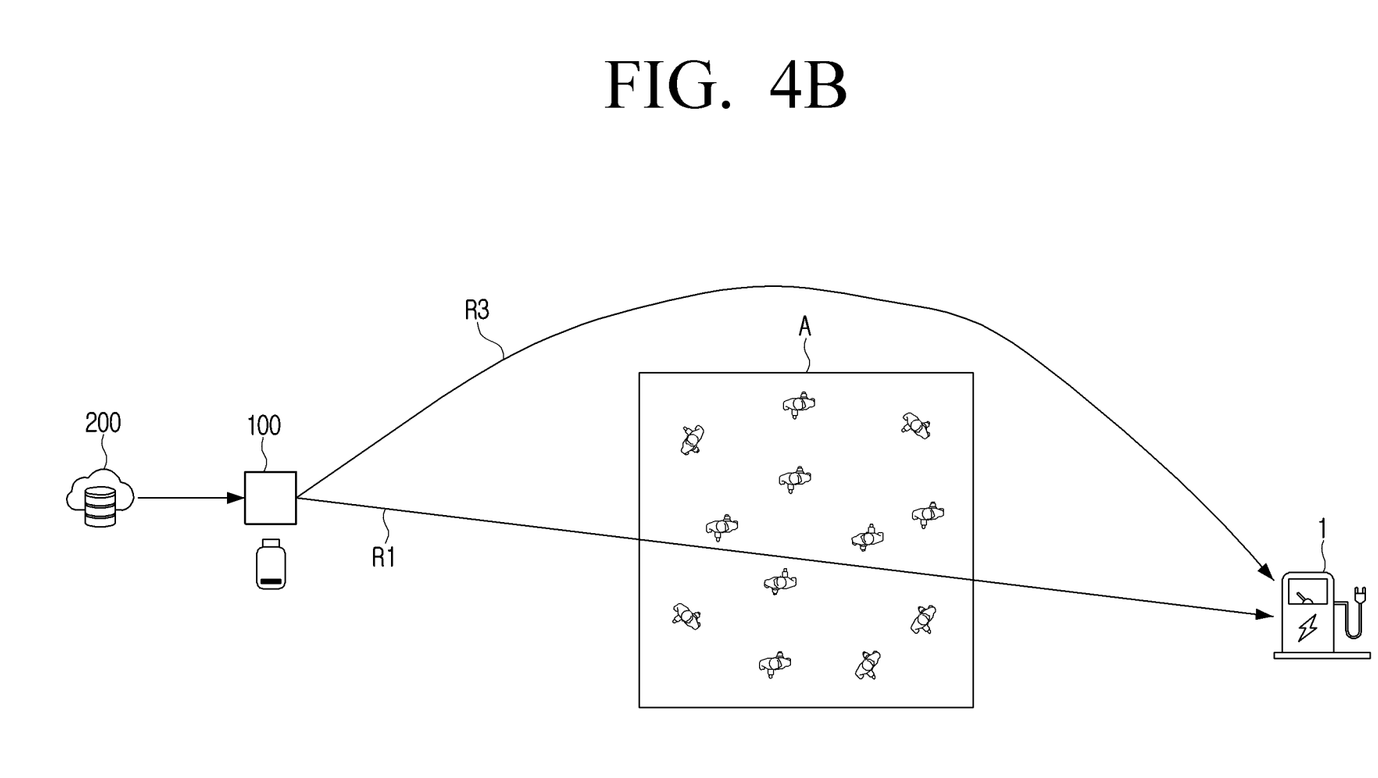
FIG. 4B is a diagram illustrating a situation of acquiring action information corresponding to a second action plan according to an embodiment.

FIG. 4B is a diagram illustrating a situation of acquiring action information corresponding to a second action plan according to an embodiment. Referring to FIG. 4B, a plurality of objects (or obstacles) may exist in the first area A located on the first route R1. The robot 100 may acquire information on the first area A from an external server 200. For example, the robot 100 may acquire an image that photographed the first area A or information on the number of objects in the first area A. The robot 100 may generate a third route R3 based on the acquired context information. The robot 100 may move to the charging station 1 through the third route R3.

The robot 100 may store a driving path generated as above, and action information and feedback information (e.g., time spent for moving) corresponding to the driving path. The robot 100 may analyze whether the stored information has a specific pattern (or tendency). For example, the robot 100 may analyze whether the stored action information has a specific pattern based on similarity between feedback information for the action information and the action information. If action information having a specific pattern exists among the stored action information, the robot 100 may store the action information having a specific pattern. For example, as in FIG. 4C, the action information may be stored in the form of a look-up table to which target information (goal), context information (context), a driving path (path), and action information (action) are matched.

Figure 4C:
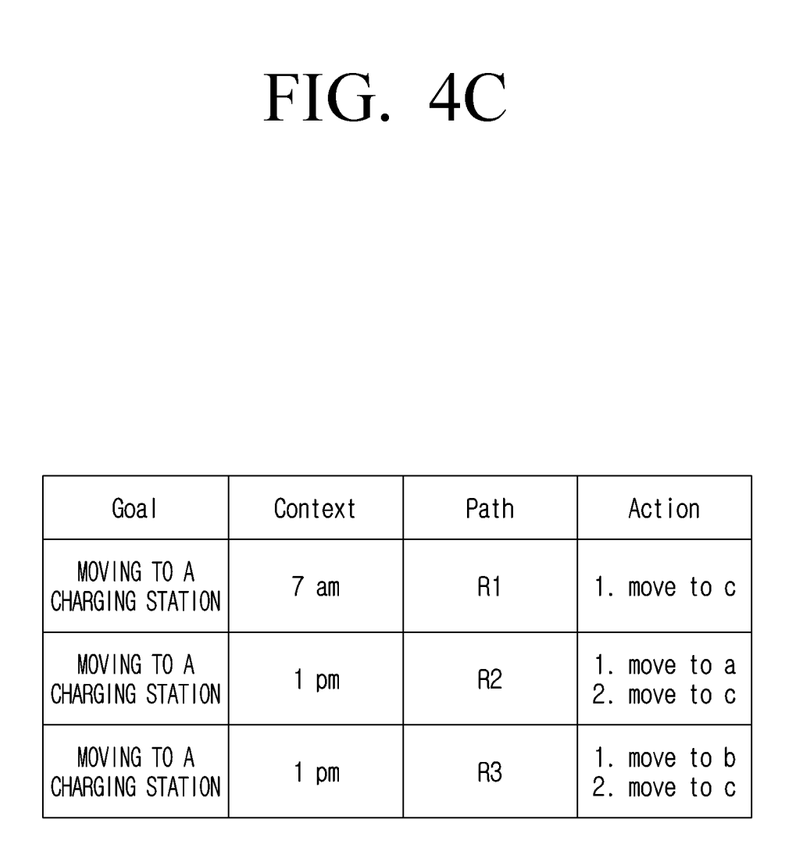
FIG. 4C is a look-up table according to an embodiment.

The robot 100 may perform an operation corresponding to target information by using the stored look-up table. That is, if target information and context information are acquired, the robot 100 may identify whether action information corresponding to the target information and the context information is stored in the robot 100. If action information corresponding to the target information and the context information is stored in the robot 100, the robot 100 may select the third action plan. That is, the robot 100 may acquire prestored action information corresponding to the acquired target information and context information. As described above, by storing generated action information and then using the stored action information, the robot 100 may perform an operation without generating new action information. Accordingly, an amount of operation resources for acquiring action information can be reduced.

The robot 100 may update action information corresponding to the third action plan. For example, if the cost value of the third route R3 is smaller than the cost value of the second route R2, the robot 100 may delete action information for the second route R2, and store action information for the third route R3, thereby updating action information.

Figure 5A:
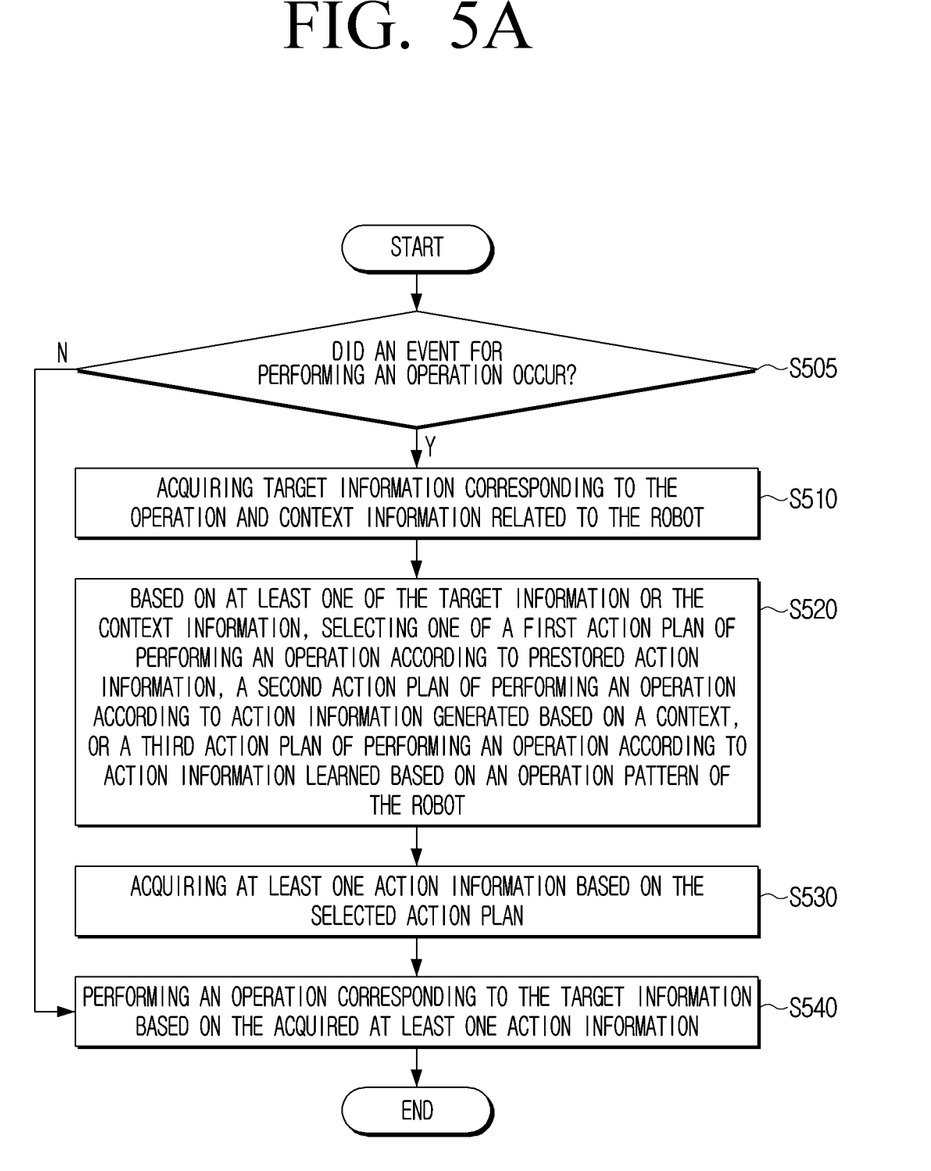
FIG. 5A is a flow chart illustrating a method for controlling a robot according to an embodiment.

FIG. 5A is a flow chart illustrating a method for controlling a robot according to an embodiment.

The robot 100 may identify whether an event for performing an operation occurred at operation S505. An event for performing an operation may be detected by the robot 100. The robot 100 may receive an event signal from a user or an external server and identify whether an event occurred. If an event for performing an operation occurs, the robot 100 may acquire target information corresponding to the operation and context information related to the robot at operation S510. The operation of the robot 100 may include an operation of moving to a specific location and an operation of stopping driving. In addition, the robot 100 may perform an operation of outputting a voice and an image, and such an operation may be performed while the robot 100 is driving. The robot 100 may detect an event for performing an operation based on information acquired through a sensor, and/or may detect an event for performing an operation based on an instruction signal received through a communication interface.

Figure 5B:
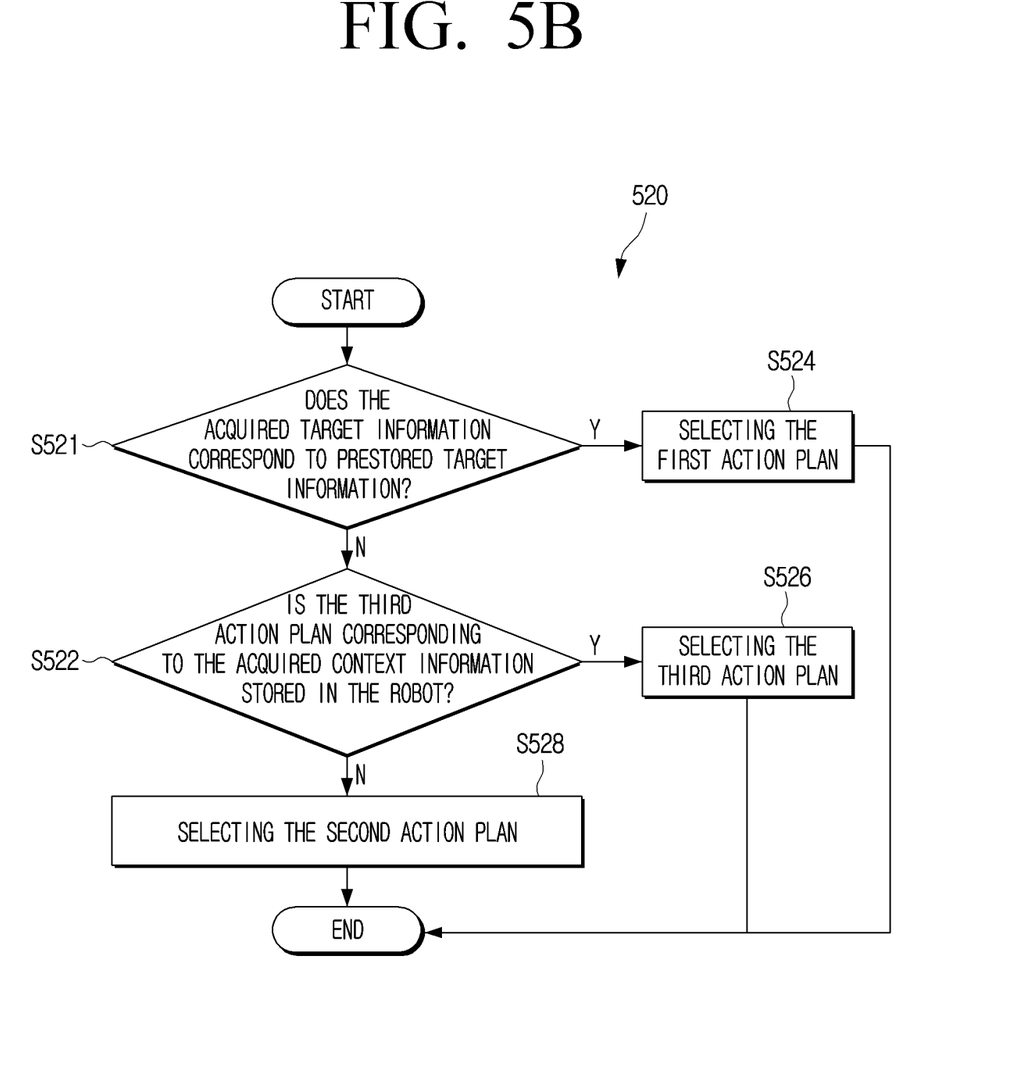
FIG. 5B is a flow chart illustrating a method for selecting an action plan according to an embodiment.

Based on at least one of the target information or the context information, the robot 100 may select one of the first action plan of performing an operation according to pre-stored action information, the second action plan of performing an operation according to action information generated based on a context, or the third action plan of performing an operation according to action information learned based on an operation pattern of the robot at operation S520. Specifically, referring to FIG. 5B, the robot 100 may identify whether the acquired target information corresponds to prestored target information at operation S521. If the acquired target information corresponds to the prestored target information, the robot 100 may select the first action plan, i.e., the static plan (operation S524). If the acquired target information does not correspond to the prestored target information, the robot 100 may identify whether the third action plan corresponding to the acquired context information is stored in the robot at operation S522. If action information corresponding to the acquired context information is stored in the robot 100, the robot 100 may select the third action plan (operation S526). If action information corresponding to the acquired context information is not stored in the robot 100, the robot 100 may select the second action plan (operation S528).

The robot 100 may acquire at least one action information based on the selected action plan at operation S530. If the first action plan is selected, the robot 100 may acquire prestored action information corresponding to the first action plan. If the second action plan is selected, the robot 100 may generate action information based on the target information and the context information. If the third action plan is selected, the robot 100 may acquire prestored action information corresponding to the third action plan.

The robot 100 may perform an operation corresponding to the target information based on the acquired at least one action information at operation S540.

Figure 6:
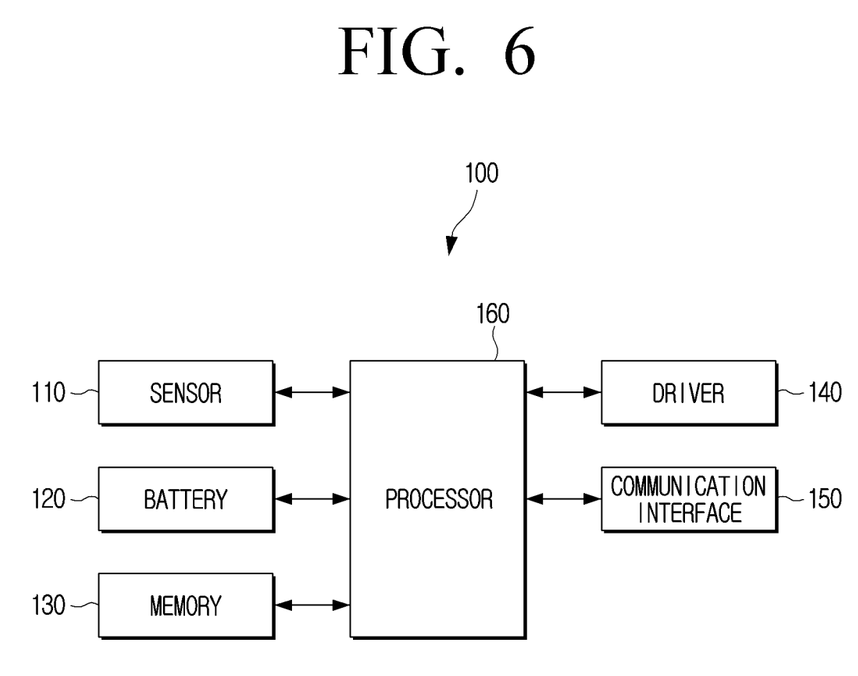
FIG. 6 is a block diagram illustrating a configuration of a robot according to an embodiment.

FIG. 6 is a block diagram illustrating a configuration of a robot according to an embodiment. Referring to FIG. 6, the robot 100 may include a sensor 110, a battery 120, a memory 130, a driver 140, a communication interface 150, and a processor 160.

The sensor 110 may detect an event for the robot 100 to perform an operation. For example, the sensor 110 may detect obstacles around the robot 100, or acquire information on the remaining amount of the battery 120. The sensor 110 may acquire context information. The sensor 110 may include one or more sensors including at least one of an image sensor, such as a camera, a distance detection sensor, a battery remaining amount detection sensor, or a GPS sensor, but an embodiment is not limited thereto.

The battery 120 is a component storing power required for operations of the robot 100. For example, the battery 120 may include a lithium-ion battery, and/or a capacitor. The battery 120 may be a rechargeable or replaceable.

The memory 130 may store an operating system (OS) for controlling the overall operations of the components of the robot 100 and instructions or data related to the components of the robot 100. The memory 130 may be implemented as a non-volatile memory (ex: a hard disc, a solid state drive (SSD), a flash memory), a volatile memory, etc. The memory 130 may store a neural network model trained to acquire action information based on target information and context information. In particular, a neural network model may be executed by a related art generic-purpose processor (e.g., a central processing unit (CPU)) or a separate AI-dedicated processor (e.g., a graphics processing unit (GPU), a network processing unit (NPU), etc.). The memory 130 may store target information, context information, and action information. For example, the memory 130 may store a look-up table in which target information, context information, and action information are associated with each other and are matched with the acquired target information and context information, to locate the action information.

The driver 140 is a component for moving the robot 100. The driver 140 may include an actuator for driving of the robot 100, e.g., a motor, a motor controller, etc.). In addition to the driver 140, an actuator for driving motions of other physical components (e.g., an arm, etc.) of the robot 100 may be included. For example, the robot 100 may control the actuator to move or operate while detouring a user detected through the sensor 110, through the driver 140.

The communication interface 150 may include at least one circuit and perform communication with various types of external apparatuses according to various types of communication methods. The communication interface 150 may include a Wi-Fi chip and a Bluetooth chip. The robot 100 may communicate with an external apparatus or an external server through the communication interface 150.

The processor 160 may control the overall operations of the robot 100.

As described above with reference to FIG. 2, the processor 160 may include a context information acquisition module 161, a target information acquisition module 162, an action plan selection module 163, an action information acquisition module 164, an action information transmission module 165, and an action information management module 166.

If an event for performing an operation occurs, the processor 160 may acquire target information corresponding to the operation and context information related to the robot.

The processor 160 may identify whether an event occurred based on data acquired through the sensor 110 and/or may identify whether an event occurred based on an instruction signal received through the communication interface 150. The processor 160 may acquire context information by using the sensor 110 and/or from an external server through the communication interface 150. The processor 160 may infer target information based on context information.

The processor 160 may select one of the first action plan, the second action plan, or the third action plan. Specifically, if the acquired target information corresponds to target information stored in advance in the memory 130, the processor 160 may select the first action plan. If the acquired target information does not correspond to the prestored target information, the processor 160 may select one of the second action plan or the third action plan. The processor 160 may identify whether the third action plan corresponding to the acquired context information is stored in the memory 130. Here, if the third action plan corresponding to the acquired context information is stored in the memory 130, the processor 160 may select the stored third action plan. If the third action plan corresponding to the acquired context information is not stored in the memory 130, the processor 160 may select the second action plan.

Functions related to the AI according to an embodiment are operated through the processor 160 and the memory 130. The processor 160 may consist of one or a plurality of processors. The one or plurality of processors may be generic-purpose processors such as a CPU, an application processor (AP), a digital signal processor (DSP), etc., graphics-dedicated processors such as a GPU and a vision processing unit (VPU), or AI-dedicated processors such as an NPU. The one or plurality of processors performs control to process input data according to predefined operation rules or an AI model stored in the memory 130. In the case that the one or plurality of processors includes an AI-dedicated processor, the AI-dedicated processors may be designed in a hardware structure specialized for processing of a specific AI model.

Predefined operation rules or an AI model are made through learning. Here, being made through learning means that a basic AI model is trained by using a plurality of learning data by a learning algorithm, and predefined operation rules or an AI model set to perform a desired characteristic (or purpose) are made. Such learning may be performed in an apparatus itself in which AI according to an embodiment is performed, or performed through a separate server and/or system. As examples of learning algorithms, there are supervised learning, unsupervised learning, semi-supervised learning, or reinforcement learning, but learning algorithms are not limited to the above examples.

An AI model may consist of a plurality of neural network layers. Each of the plurality of neural network layers has a plurality of weight values, and performs a neural network operation through an operation between the operation result of the previous layer and the plurality of weight values. The plurality of weight values that the plurality of neural network layers have may be optimized by a learning result of an AI model. For example, the plurality of weight values may be updated such that a loss value or a cost value acquired from an AI model during a learning process is reduced or minimized.

Visual understanding is a technology of recognizing an object in a similar manner to human vision, and processing the object, and includes object recognition, object tracking, image retrieval, human recognition, scene recognition, space recognition (3D reconstruction/localization), image enhancement, etc.

An artificial neural network may include a deep neural network (DNN), and there are, for example, a convolutional neural network (CNN), a deep neural network (DNN), a recurrent neural network (RNN), a generative adversarial network (GAN), a restricted Boltzmann machine (RBM), a deep belief network (DBN), a bidirectional recurrent deep neural network (BRDNN), or deep Q-networks, etc., but the neural network is not limited.

Embodiments described herein may be implemented in a recording medium that is readable by a computer or an apparatus similar thereto, by using software, hardware or a combination thereof. In some cases, Embodiments described herein may be implemented as a processor itself. According to implementation by software, embodiments such as procedures and functions described herein be implemented as separate software modules. Each of the software modules may perform one or more functions and operations described herein.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact disc (CD), a digital video disc (DVD), a hard disc, a blue-ray disc, a universal serial bus (USB), a memory card, a read only memory (ROM) and the like.

The non-transitory storage medium only means that the apparatus is a tangible apparatus, and does not include a signal (e.g., an electronic wave), and the term does not distinguish a case where data is stored in a storage medium semi-permanently and a case where data is stored temporarily. For example, a non-transitory storage medium may include a buffer where data is temporarily stored.

According to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or may be distributed directly between two user apparatuses (e.g., smartphones), and distributed on-line (e.g., download or upload) through an application store (e.g., PLAYSTORE™). In the case of on-line distribution, at least a portion of a computer program product (e.g., a downloadable app) may be stored in a storage medium that is readable by apparatuses such as the server of the manufacturer, the server of the application store, and the memory of the relay server at least temporarily, or may be generated temporarily.

According to embodiments, a robot may adaptively select an action plan according to a situation and perform an operation corresponding to the selected action plan. Accordingly, user convenience and satisfaction can be improved.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A robot comprising:
  a driver configured to move the robot;
  a memory configured to store at least one instruction and predetermined target information; and
  a processor configured to execute the at least one instruction to:
    based on an occurrence of an event for performing an operation, acquire current target information corresponding to the operation and current context information related to the robot,
    based on at least one from among the acquired current target information and the acquired current context information, select an action plan among a first action plan for performing the operation according to first action information stored in advance in the memory, a second action plan for performing the operation according to second action information based on the acquired current target information and the acquired current context information, and a third action plan for performing the operation according to third action information corresponding to the acquired current context information, wherein the third action information is obtained based on an operation pattern of the robot learned based on a plurality of operations of the robot previously performed over time, wherein the predetermined target information is information for executing the first action plan, the first action plan being stored in advance in the memory,
    acquire at least one action information based on the selected action plan, and
    control the driver to perform the operation corresponding to the acquired current target information based on the at least one action information, wherein the processor is further configured to:
    determine whether the acquired current target information corresponds to the predetermined target information stored in the memory,
    based on determining that the acquired current target information corresponds to the predetermined target information stored in the memory, select the first action plan stored in advance in the memory, acquire the first action information stored in advance in the memory, and control the driver to perform the operation based on the acquired first action information, and
    based on determining that the acquired current target information does not correspond to the predetermined target information stored in the memory, select one action plan among the second action plan and the third action plan, and control the driver to perform the operation based on the selected one action plan, wherein the processor is further configured to:
    based on determining that the acquired current target information does not correspond to the predetermined target information stored in the memory, determine whether the third action plan corresponding to the acquired current context information is stored in the memory,
    based on determining that the third action plan is stored in the memory, select the third action plan, acquire the third action information corresponding to the third action plan from the memory, and control the driver to perform the operation based on the acquired third action information, and
    based on determining that the third action plan is not stored in the memory, select the second action plan, generate the second action information based on the acquired current target information and the acquired current context information, and control the driver to perform the operation based on the generated second action information, and wherein the processor is further configured to:
    store information on the plurality of operations of the robot in the memory, wherein the stored information on the plurality of operations includes a plurality of driving paths of the robot and a plurality of pieces of action information corresponding to the plurality of driving paths of the robot,
    analyze whether the plurality of pieces of action information include action information having a specific pattern, and
    based on the plurality of pieces of action information including the action information having the specific pattern, store the action information having the specific pattern in the memory in a form of a look-up table in which target information of the robot, context information of the robot, a driving path of the robot and an action of the robot are matched with each other, and
  wherein the processor is further configured to:
    identify whether the current target information and the current context information match the target information and the context information stored in the look-up table, respectively, and
    select the third action plan corresponding to the target information and the context information stored in the look-up table based on the current target information and the current context information matching the target information and the context information stored in the look-up table, respectively.

2. The robot of claim 1, wherein the processor is further configured to:
  based on the third action plan being determined as stored, acquire the third action information corresponding to the stored third action plan, from the look-up table.

3. The robot of claim 1, wherein the processor is further configured to:
  based on the second action plan being selected, input the acquired current target information and the acquired current context information into a trained artificial intelligence model, and acquire the second action information corresponding to the second action plan based on a result output by the trained artificial intelligence model.

4. The robot of claim 2, wherein the processor is further configured to:

acquire first feedback information regarding the third action information corresponding to the operation performed according to the third action plan, acquire second feedback information regarding the third action information corresponding to the stored third action plan, and update the third action information in the look-up table based on the first feedback information and the second feedback information.

5. The robot of claim 1, wherein the acquired current context information includes at least one from among information on a current time, information on a current location of the robot, and information on obstacles around the robot.

6. A method for controlling a robot, the method comprising:

based on an occurrence of an event for performing an operation, acquiring current target information corresponding to the operation and current context information related to the robot;

based on at least one from among the acquired current target information and the acquired current context information, selecting an action plan among a first action plan for performing the operation according to first action information stored in advance in the robot and corresponding to a predetermined target information stored in the robot, a second action plan for performing the operation according to second action information based on the acquired current target information and the acquired current context information, and a third action plan for performing the operation according to third action information corresponding to the acquired current context information, wherein the third action information is obtained based on an operation pattern of the robot learned based on a plurality of operations of the robot previously performed over time, the first action plan being stored in advance in the robot;

wherein the selecting further comprises:

determining whether the acquired current target information corresponds to the predetermined target information stored in the robot;

based on determining that the acquired current target information corresponds to the predetermined target information stored in the robot, selecting the first action plan stored in advance in the robot, acquiring the first action information stored in advance in the robot, and performing the operation based on the acquired first action information; and based on determining that the acquired current target information does not correspond to the predetermined target information stored in the robot, selecting one action plan among the second action plan and the third action plan, and performing the operation based on the selected one action plan, wherein the selecting of the one action plan and the performing of the operation based on the selected one action plan comprise:

based on determining that the acquired current target information does not correspond to the predetermined target information stored in the robot, determining whether the third action plan corresponding to the acquired current context information is stored in the robot;

based on determining that the third action plan is stored in the robot, selecting the third action plan, acquiring the third action information corresponding to the third action plan from the robot, and performing the operation based on the acquired third action information; and based on determining that the third action plan is not stored in the robot, selecting the second action plan, generate the second action information based on the acquired current target information and the acquired current context information, and performing the operation based on the generated second action information, wherein the method further comprises:

storing information on the plurality of operations of the robot in a memory of the robot, wherein the stored information on the plurality of operations includes a plurality of driving paths of the robot and a plurality of pieces of action information corresponding to the plurality of driving paths of the robot, analyzing whether the plurality of pieces of action information include action information having a specific pattern, and based on the plurality of pieces of action information including the action information having the specific pattern, storing the action information having the specific pattern in the robot in a form of a look-up table in which target information of the robot, context information of the robot, a driving path of the robot and an action of the robot are matched with each other, and wherein the selecting of the third action plan comprises:

identifying whether the current target information and the current context information match the target information and the context information stored in the look-up table, respectively, and selecting the third action plan corresponding to the target information and the context information stored in the look-up table based on the current target information and the current context information matching the target information and the context information stored in the look-up table, respectively.

7. The method of claim 6, wherein the acquiring the third action information comprises:

based on the third action plan being determined as stored, acquiring the third action information corresponding to the stored third action plan from the look-up table.

8. The method of claim 6, wherein the acquiring the second action information comprises:

based on the second action plan being selected, inputting the acquired current target information and the acquired current context information into a trained artificial intelligence model; and acquiring the second action information corresponding to the second action plan based on a result output by the trained artificial intelligence model.

9. The method of claim 7, further comprising:

acquiring first feedback information regarding the third action information corresponding to the operation performed according to the third action plan;

acquiring second feedback information regarding the third action information corresponding to the stored third action plan; and updating the third action information in the look-up table based on the first feedback information and the second feedback information.

10. A non-transitory computer-readable storage medium storing at least one instruction which, when executed by a processor, causes the processor to perform a method for controlling a robot, the method including:

based on an occurrence of an event for performing an operation, acquiring current target information corresponding to the operation and current context information related to the robot;

based on at least one from among the acquired current target information and the acquired current context information, selecting an action plan among a first action plan for performing an operation according to first action information stored in advance in the robot and corresponding to a predetermined target information stored in the robot, a second action plan for performing the operation according to second action information based on the acquired current target information and the acquired current context information, and a third action plan for performing the operation according to third action information corresponding to the acquired current context information, wherein the third action information is obtained based on an operation pattern of the robot learned based on a plurality of operations of the robot previously performed over time, the first action plan being stored in advance in the robot;

wherein the selecting further includes:
determining whether the acquired current target information corresponds to the predetermined target information stored in the robot;
based on determining that the acquired current target information corresponds to the predetermined target information stored in the robot, selecting the first action plan stored in advance in the robot, acquiring the first action information stored in advance in the robot, and performing the operation based on the acquired first action information; and
based on determining that the acquired current target information does not correspond to the predetermined target information stored in the robot, selecting one action plan among the second action plan and the third action plan, and performing the operation based on the selected one action plan, wherein the selecting of the one action plan and the performing of the operation based on the selected one action plan comprise:
based on determining that the acquired current target information does not correspond to the predetermined target information stored in the robot, determining whether the third action plan corresponding to the acquired current context information is stored in the robot;
based on determining that the third action plan is stored in the robot, selecting the third action plan, acquiring the third action information corresponding to the third action plan from the robot, and performing the operation based on the acquired third action information; and
based on determining that the third action plan is not stored in the robot, selecting the second action plan, generating the second action information based on the acquired current target information and the acquired current context information, and performing the operation based on the generated second action information, wherein the method further comprises:
storing information on the plurality of operations of the robot in the robot, wherein the stored information on the plurality of operations includes a plurality of driving paths of the robot and a plurality of pieces of action information corresponding to the plurality of driving paths of the robot,
analyzing whether the plurality of pieces of action information include action information having a specific pattern, and
based on the plurality of pieces of action information including the action information having the specific pattern, storing the action information having the specific pattern in the robot in a form of a look-up table in which target information of the robot, context information of the robot, a driving path of the robot and an action of the robot are matched with each other, wherein the selecting of the third action plan comprises:
identifying whether the current target information and the current context information match the target information and the context information stored in the look-up table, respectively, and
selecting the third action plan corresponding to the target information and the context information stored in the look-up table based on the current target information and the current context information matching the target information and the context information stored in the look-up table, respectively.

11. The non-transitory computer-readable storage medium of claim 10, wherein the acquiring the second action information includes:
based on the second action plan being selected, inputting the acquired current target information and the acquired current context information into a trained artificial intelligence model; and
acquiring the second action information corresponding to the second action plan based on a result output by the trained artificial intelligence model.

12. The robot of claim 1, wherein the first action plan is stored in the memory and defines an emergency operation corresponding to the predetermined target information, and
the current context information comprises at least current information on an obstacle in an area of the robot.

13. The non-transitory computer-readable storage medium of claim 10, wherein the acquiring the third action information comprises:
based on the third action plan being determined as stored, acquiring the third action information corresponding to the stored third action plan from the look-up table.

* * * * *